May 26, 1970      H. N. RENES      3,513,607
MODULAR HIGH RISE BUILDING CONSTRUCTION
Filed Aug. 20, 1968      5 Sheets-Sheet 1
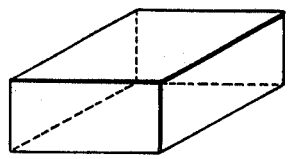
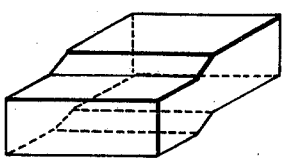
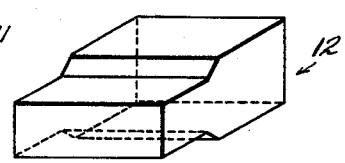
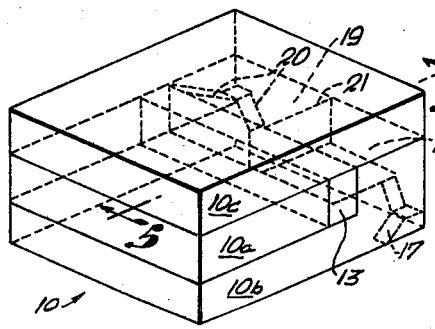
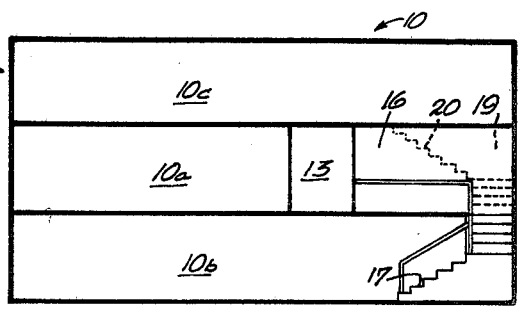
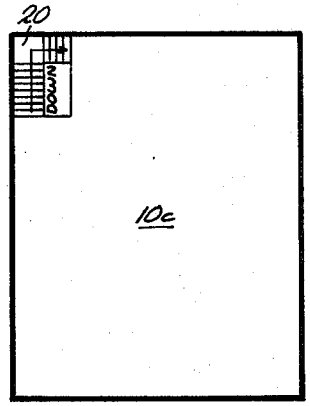
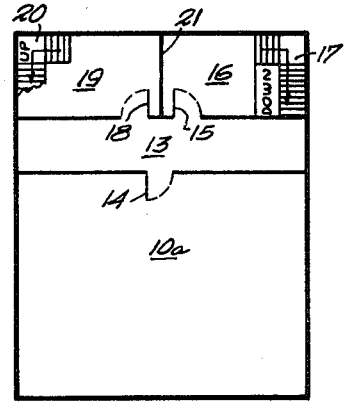
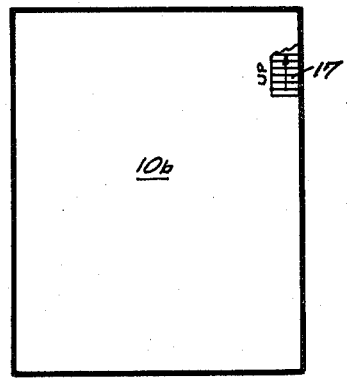
INVENTOR.
HECTOR N. RENES
BY James J. Carmon
ATTORNEY.

May 26, 1970  H. N. RENES  3,513,607

MODULAR HIGH RISE BUILDING CONSTRUCTION

Filed Aug. 20, 1968  5 Sheets-Sheet 2

INVENTOR.
HECTOR N. RENES
BY James J. Cannon
ATTORNEY.

May 26, 1970  H. N. RENES  3,513,607
MODULAR HIGH RISE BUILDING CONSTRUCTION
Filed Aug. 20, 1968  5 Sheets-Sheet 3

INVENTOR.
HECTOR N. RENES
BY
ATTORNEY.

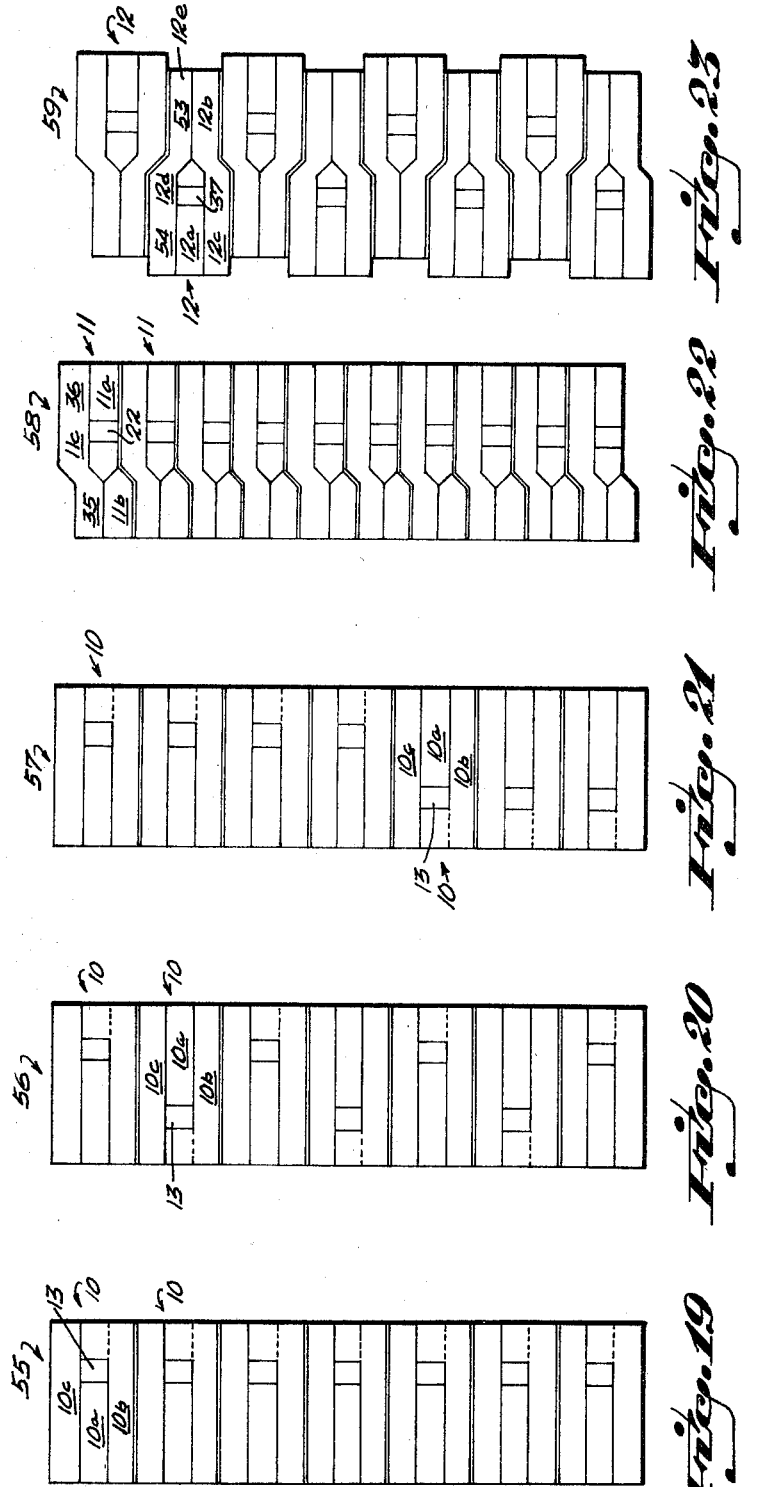

May 26, 1970    H. N. RENES    3,513,607
MODULAR HIGH RISE BUILDING CONSTRUCTION
Filed Aug. 20, 1968    5 Sheets-Sheet 5
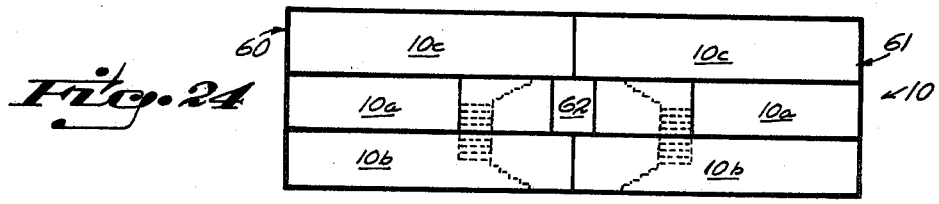
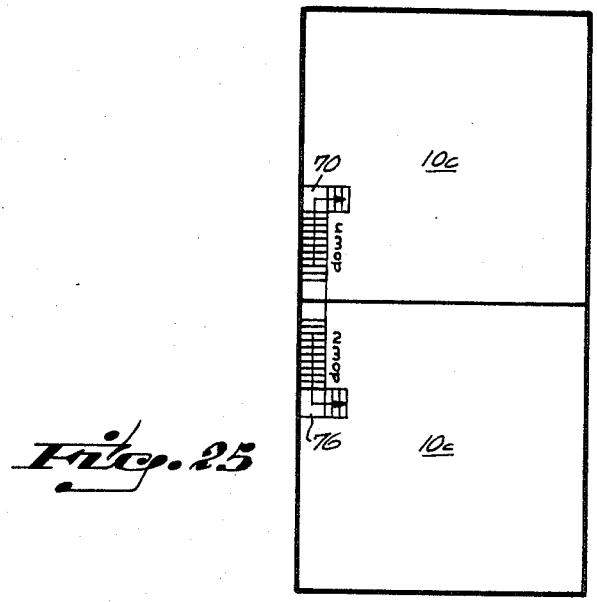
INVENTOR.
HECTOR N. RENES
BY
ATTORNEY.

United States Patent Office 3,513,607
Patented May 26, 1970

3,513,607
MODULAR HIGH RISE BUILDING
CONSTRUCTION
Hector N. Renes, 3650 Edwin Ave., Apt. 1C,
Fort Lee, N.J. 07024
Filed Aug. 20, 1968, Ser. No. 754,057
Int. Cl. E04f *11/00;* E04h *1/04*
U.S. Cl. 52—79
8 Claims

ABSTRACT OF THE DISCLOSURE

A high rise building construction utilizing a plurality of vertically and/or horizontally joined modules, each module of which comprises a plurality of suites on three or more floor levels. An end-to-end corridor on the intermediate floor level provides direct access to suites on the floor through appropriate doorways and access to relatively upper and lower suites by means of stairways terminating in foyers entered through doorways leading from the intermediate floor level corridor. In a vertically arranged system of such modules corridor ends are vertically aligned for service by a common elevator.

This invention relates to building construction and is directed particularly to a new and improved modular unit construction, the modules of which are adapted to be serially linked or concatenated both vertically and horizontally for service by a common elevator or elevator bank or banks to provide maximum use of floor space while at the same time providing to one hundred percent of the units outlook to one side to the exterior landscape, if desired.

The principal object of my invention is to provide a modular high rise building construction of the above nature where the utmost privacy is provided for the individual living units or suites of each modules, both with respect to those in other living quarters within the building and the exterior landscape.

A more particular object of the invention is to provide a new and improved system of building construction particularly for multistory and high rise apartment or office buildings wherein modular construction of living space is utilized and wherein each module comprises a plurality of separate living quarters or suites having a common corridor arranged at an intermediate level affording access to the various living units at the same or at relatively upper and lower levels. Access from the corridors to upper and lower living units or suites is had by means of stairways leading from lobbies or foyers entered through the corridor. The modules are adapted to be serially linked in various combinations, both vertically and horizontally arranged, so that corridors at the same level as well as corridors at successive elevations will be aligned and in register with one another for service by a common elevator.

Other objects, features and advantages of the invention will be apparent from the following description when read with reference to the accompanying drawings.

In the drawings, wherein like reference numerals denote corresponding parts throughout the several views:

FIG. 1 is an oblique view illustrating the shape of one form of modular unit embodying the invention;

FIG. 2 is an oblique view illustrating the shape of a second form of modular unit embodying the invention;

FIG. 3 is an oblique view illustrating the shape of still another form of modular unit embodying the invention;

FIG. 4 is an oblique view of the first form of modular unit illustrated in FIG. 1, on an enlarged scale, and illustrating, schematically, the interior layout of the various living areas, the common corridor and the interconnecting stairways;

FIG. 5 is an elevational view of the modular unit illustrated in FIG. 4, taken along the line 5—5 of FIG. 4 in the direction of the arrow and facing the end of the corridor associated with a stairway leading to the lower level;

FIG. 6 is a plan view of the upper floor of the modular unit illustrated in FIGS. 4 and 5;

FIG. 7 is a plan view of the central floor or corridor level thereof;

FIG. 8 is a plan view of the lower floor thereof;

FIG. 19 illustrates, in elevation, a first form of high rise structure utilizing a plurality of vertically arranged modular units of the type exemplified in FIGS. 1 and 4 through 8;

FIG. 20 illustrates a first alternative arrangement of the high rise structure shown in FIG. 19;

FIG. 21 illustrates a second alternative arrangement of the high rise structure shown in FIG. 19;

FIG. 22 illustrates, in elevation, a form of high rise structure utilizing a plurality of vertically arranged modular units of the type exemplified in FIGS. 2 and 9 through 12;

FIG. 23 illustrates, in elevation, a form of high rise structure utilizing a plurality of vertically arranged modular units of the type exemplified in FIGS. 3 and 13 through 18;

FIG. 24 illustrates, in side elevation, a modified form of the modular unit illustrated in FIG. 1, wherein living quarters or suites are arranged at each side of a centrally-located corridor in duplex fashion;

FIG. 25 is a plan view of the upper story of the modular unit illustrated in FIG. 24;

FIG. 26 is a central or corridor plan view thereof; and

FIG. 27 is a lower floor plan thereof.

Figure 9:
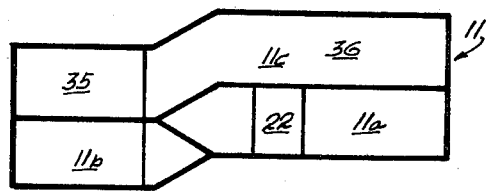
FIG. 9 is a side elevational view of the basic modular unit illustrated in FIG. 2.

Referring now in detail to the drawings and considering first the embodiment of the invention illustrated in FIG. 1 and FIGS. 4 through 8, 10 designates, generally, the rectangular shape of the modular unit, the same being divided into an intermediate, central or corridor level floor or story 10*a*, a lower floor or story 10*b* and an upper floor or story 10*c*. The central floor or story 10*a* has an end-to-end corridor 13, offset to one side and providing access to the central floor suite or living quarters through a doorway 14. A doorway 15 leading from the opposite side of the corridor 13 into a foyer 16 provides access to the lower story suite or living area 10*b* by means of a stairway 17. A second doorway 18 leading from the corridor 13 at the same side thereof as the doorway 15, and entering a foyer 19, provides access to the upper level or story 10*c* through stairway 20. The foyers 16 and 19 are preferably separated by a partition wall 21 affording additional separation and privacy between the upper and lower stories.

Figure 10:
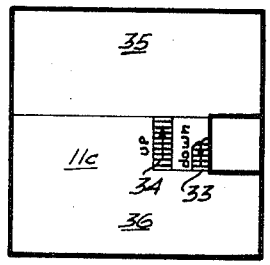
FIG. 10 is an plan view of the upper floor of the modular unit illustrated in FIG. 9.
Figure 11:
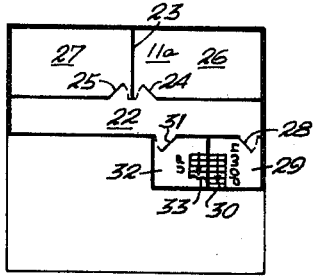
FIG. 11 is a plan view of the central floor thereof.
Figure 12:
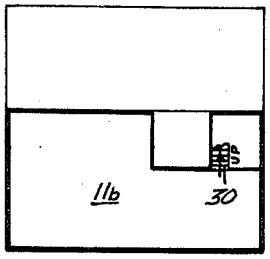
FIG. 12 is a plan view of the lower floor thereof.
Figure 13:
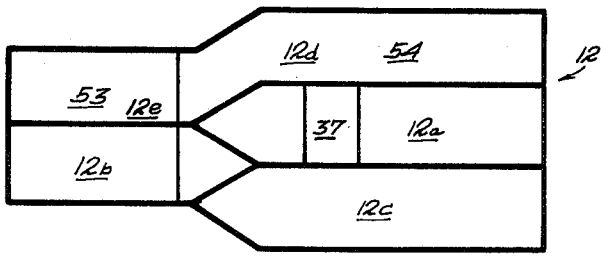
FIG. 13 illustrates, in side elevation and in an enlarged scale, the modular unit illustrated in FIG. 3, showing the central corridor and the various floor levels thereof.
Figure 14:
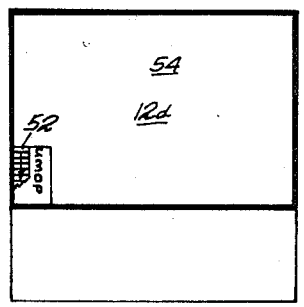
FIG. 14 is a plan view of the upper floor level of the modular unit illustrated in FIG. 13.
Figure 15:
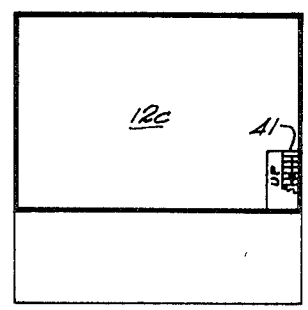
FIG. 15 is a plan view of the lower floor level thereof.

FIGS. 9 through 12 illustrate a module of the type shown in FIG. 2, and designated by reference numeral 11. The module 11 comprises a central intermediate or corridor level floor or story 11a, a lower story 11b downwardly offset at one side by the height of one-half story, and an upper level or story 11c. As illustrated in FIG. 10 in plan view, the upper level or story 11c above the central story 11a extends downwardly one-half story to provide an intermediate story portion 35 above the lower story 11b. Referring to FIG. 11, it will be seen that the central level or story 11a is provided with an end-to-end corridor 22, offset to one side, defining a living quarters area at the same side which may be centrally partitioned, as indicated at 23. Doorways 24 and 25 at one side of the corridor 22 and at each side of the partition 23 provide access to the individual living quarters or suites 26, 27, respectively. A doorway 28 at the other side of the corridor 22 near one end thereof leads to a foyer or landing 29 providing access to stairway 30 leading to the lower story living area or suite 11b. A second doorway 31 in the same side of the corridor 22 as that of the doorway 28 leads to a second landing or foyer 32 providing access to the lower level of the upper story 11c, designated zone 35, through a stairway 33. A stairway 34 leads from the lower level of the upper story living area 11c, that is, zone 35, to the upper zone 36 thereof.

Figure 16:
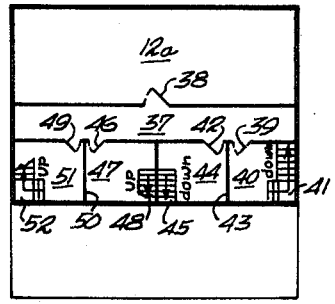
FIG. 16 is a plan view of the central or corridor floor level thereof.
Figure 17:
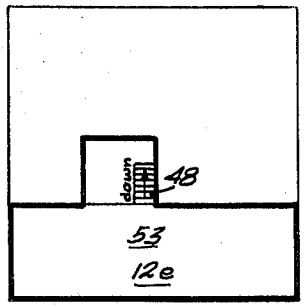
FIG. 17 is a plan view of the upper intermediate floor level thereof.
Figure 18:
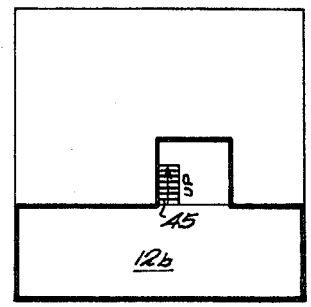
FIG. 18 is a plan view of the lower intermediate floor level thereof.

FIGS. 13 through 18 illustrate a module of the type shown in FIG. 3 and designated by reference numeral 12. The module 13 comprises a central intermediate or corridor level floor or story 12a, an intermediate lower story 12b, a lower story 12c, and an upper story 12d. The intermediate lower story 12b is downwardly offset at one side by the height of one-half story, and is, therefore, intermediate the central and lower stories, 12a and 12c, respectively. Referring to FIG. 16, it will be seen that the central level or story 12a is provided with an end-to-end corridor 37 offset to one side and defining a living quarters area at one side of that floor level to which access is provided by a doorway 38. A doorway 39 on the other side of the corridor leads to a foyer 40 through which access to the lower living area or story 12c is had through stairway 41 (see FIG. 15). A second doorway 42 leads to a second foyer 44 in alignment with the foyer 40 and divided therefrom by partition wall 43. The foyer 44 leads through stairway 45 to intermediate lower story 12b (see FIG. 18). Another doorway 46 leading from the corridor 37 enters a third foyer 47 in alignment with the foyers 40 and 44 through which access to the intermediate upper story 12e, that is, living area zone 53 is had through stairway 48 (see FIG. 17). Still another doorway 49 in the corridor 37 leads to a foyer 51 in alignment with foyers 44 and 47 through which access is had to the upper story 12d, that is, living area zone 54. The foyer 51 is separated from the foyer 47 by a partition 50.

FIG. 19 illustrates how a plurality of modules of the type illustrated in FIG. 1 and FIGS. 4 through 8 can be vertically arranged or stacked in a multistory or high rise building. As illustrated in FIG. 19, the modules 10 may be identical so that the corridors 13 thereof will be in vertical alignment. With such construction, a single elevator shaft or elevator bank, if required, having an elevator cab stopping at each corridor level or story will serve the building.

FIG. 20 illustrates a modified high rise construction utilizing modules 10 in a multistory or high rise construction wherein every other module is of reversed plan arrangement. With this construction, every other corridor end will be displaced to the opposite side of the building, providing for the use of one or two elevator shafts or elevator banks. In that last case, one for serving each set of vertically-aligned corridors, if required.

FIG. 21 illustrates still another multistory or high rise arrangement utilizing modules 10 wherein, instead of alternating units of reversed floor plan, a first vertical series having the same plan is utilized above which a second vertical series having a reversed floor plan is used. Here again, one or two elevator shafts or elevator banks are used, if required, for servicing the building.

FIG. 22 illustrates how a plurality of modules of the type illustrated in FIGS. 9 through 12 can be vertically arranged or stacked in a high rise building. As illustrated in FIG. 22, the modules 11 may be identical so that the corridors 22 thereof will be in vertical alignment. With such construction, a single elevator shaft having a cab stopping at each corridor level will serve the building.

FIG. 23 illustrates how a plurality of modules 12 of the type illustrated in FIGS. 13 through 18 can be vertically arranged or stacked in interfitting or nested disposition in a high rise building. As illustrated in FIG. 23, the modules 12 may be identical, but since they are opposedly internested, every other unit will have its corridor end 37 displaced so that one of more elevator shafts may be required to serve the building but not necessarily more than one if required.

FIGS. 24 through 27 illustrate a modification of the basic rectangular module structure shown in FIG. 1 wherein two units 60 and 61 of mutually reversed floor plan are arranged at each side of a central corridor 62, said corridor in this instance being centrally located both vertically and horizontally. As illustrated in FIG. 26, doorways 63 and 64 centrally located at each side of the corridor 62 lead directly to central floor level suites or stories 10a, 10a at each side of the module. A doorway 65 near one end of the corridor leads to a foyer 66 providing access to the lower level suite or story 10b at that side of the modular unit through stairway 67 (see FIG. 27). A doorway 68 near the other end of the corridor leads to a foyer 69 providing access to the upper level suite or story 10c through stairway 69 (see FIG. 25). Similarly, doorways 71 and 74 in the opposite side of the corridor lead to foyers 72 and 75, respectively, providing access to lower and upper stories 10b and 10c, respectively, at the opposite side of the modular unit through respective stairways 73 and 76. It will be understood that with this construction, since the corridors are centrally located, only one elevator will be required to service a high rise comprising a plurality of such modules vertically arranged.

While I have illustrated and described herein only three basic forms in which the invention can conveniently be embodied in practice, these forms are given by way of example only and not in a limiting sense. The invention, in brief, comprises all the modifications of the invention coming within the scope and spirit of the following claims.

What I claim as new and desire to secure by Letters Patent is:

1. A building structure comprising one or more vertically and/or horizontally disposed modular units, each modular unit comprising an intermediate story, a relatively upper story and a relatively lower story, each story having at least one room constituting at least one suite, the intermediate story having a corridor open to one or both ends of said unit, a first passageway between said corridor and a suite of said intermediate story, a first foyer on said intermediate story, a passageway leading from said corridor to said first foyer, a stairway from said first foyer to said lower story, a second foyer on said intermediate story, a passageway leading from said corridor to said second foyer, and a stairway leading from said second foyer to said upper story.

2. A building structure as defined in claim 1, including an intermediate upper story between said intermediate story and said upper story and at one side of said corridor, and an intermediate lower story at an intermediate level between said intermediate story and said lower story and at said one side of said corridor, a third foyer on said intermediate story, a passageway leading from said corridor to said third foyer, a stairway leading from third foyer to said upper story, a fourth foyer on said intermediate story, a passageway leading from said corridor to said fourth foyer, and a stairway leading from said fourth foyer to said intermediate lower story.

3. A building structure as defined in claim 1, including an intermediate upper story at an intermediate level between said intermediate story and said upper story, and a stairway leading between said upper story and intermediate upper story, said lower story being directly below said intermediate upper story.

4. A building structure as defined in claim 1 wherein said intermediate, relatively upper and relatively lower stories each have suites arranged at opposite sides of said corridor, a passageway leading between said corridor and a second suite of said intermediate story, a third foyer on said intermediate story, a passageway leading from said corridor to said third foyer, a stairway leading from said third foyer to said upper story, a fourth foyer on said intermediate story, a passageway leading from said corridor to said fourth foyer, and a stairway leading from said fourth foyer to said lower story.

5. A building structure as defined in claim 4 wherein each corridor is centrally located both vertically and horizontally in its modular unit.

6. A building structure as defined in claim 5 wherein said first and second foyers are arranged at one side of said corridor, and said third and fourth foyers are arranged at the other side thereof.

7. A building structure as defined in claim 1 wherein said vertically disposed units are so arranged that their corridors are in vertical alignment for service by a common elevator.

8. A building structure as defined in claim 1 wherein the corridors of each modular unit are horizontally offset, and wherein said vertically disposed units are so arranged that a first plurality thereof are in vertical alignment and horizontally displaced from a second plurality thereof in vertical alignment for service by elevator shafts.

References Cited

FOREIGN PATENTS 155,857    1921    Great Britain.

OTHER REFERENCES

Engineering News Record, June 2, 1949, pp. 16, 17 and 18, 52–236.

House and Home, December 1952, pp. 118 and 119, 52–236.

Architectural Forum, April 1966, p. 50, Scientific Library.

JOHN E. MURTAGH, Primary Examiner

U.S. Cl. X.R.

52—185, 236